UNITED STATES PATENT OFFICE.

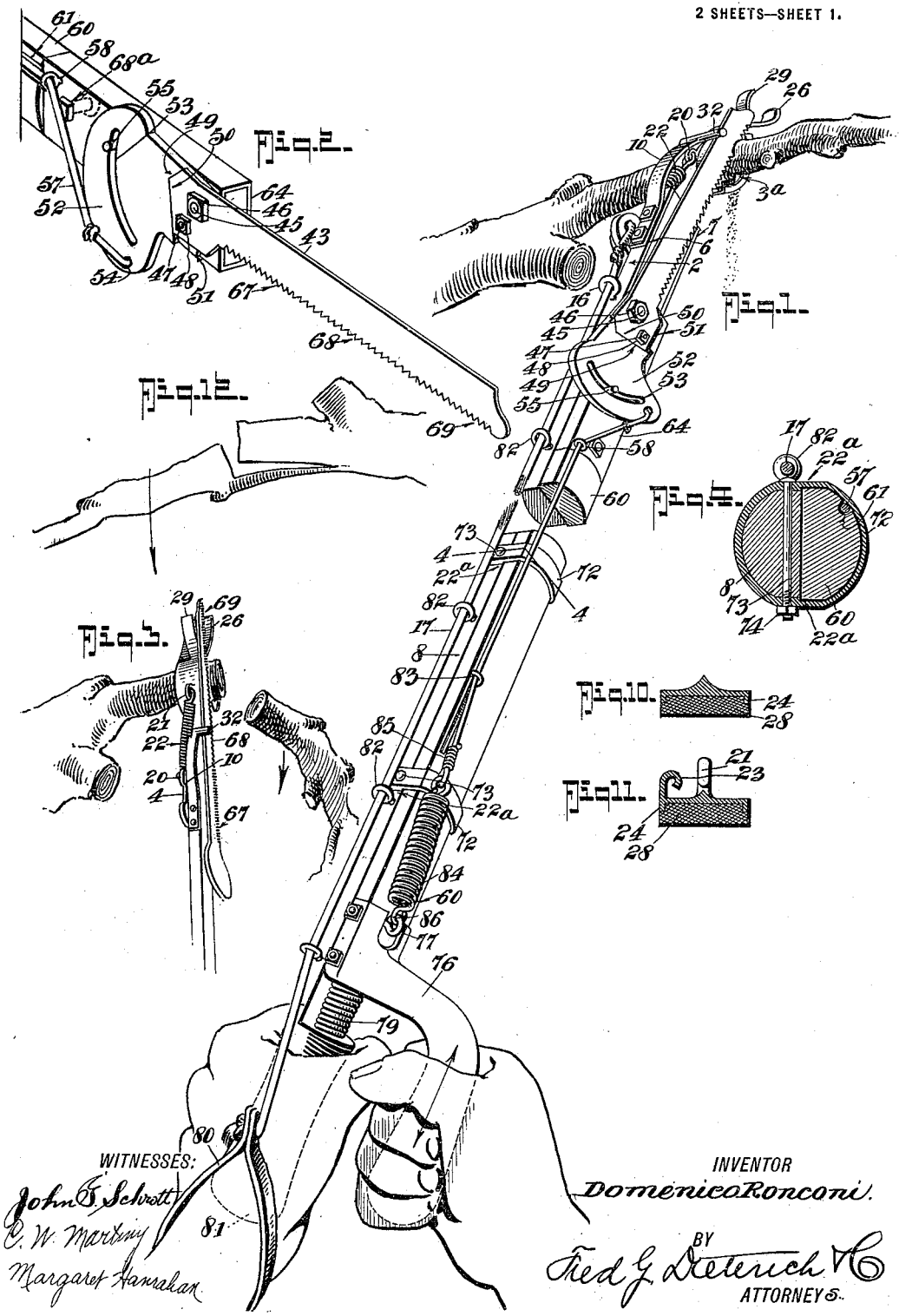

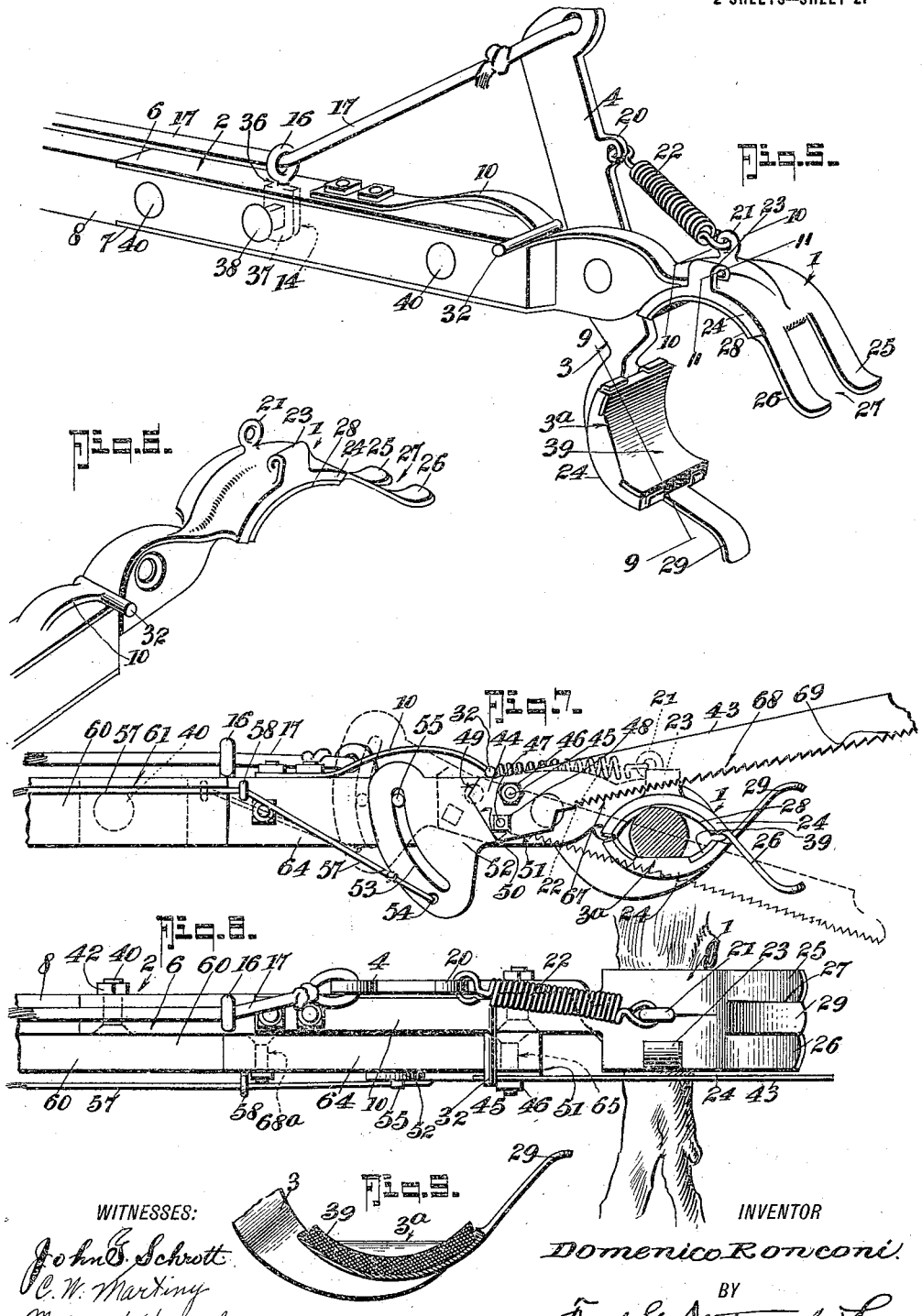

DOMENICO RONCONI, OF CHICAGO, ILLINOIS.

PRUNING IMPLEMENT.

1,137,286.

Specification of Letters Patent.  Patented Apr. 27, 1915.

Application filed May 29, 1914. Serial No. 841,785.

*To all whom it may concern:*

Be it known that I, DOMENICO RONCONI, a subject of the King of Italy, at present residing at Chicago, in the county of Cook and State of Illinois, have invented a new and Improved Pruning Implement, of which the following is a specification.

My invention has reference to improvements in pruning implements or devices more especially designed for pruning and trimming trees, particularly fruit trees, and it primarily has for its object to provide an improved construction of pruning implement by which the operation of trimming or pruning the tree branches can be conveniently and effectively accomplished by the operator while standing on the ground and by the use of which the operator is not required to climb the tree or use a ladder or other like support for sustaining him in a desired position for operating the implement.

Another object of my invention is to provide a pruning implement in which the cutting elements and the means for gripping the branch or limb to be trimmed are coöperatively so combined and designed that the operation of severing the said branch or limb may be readily accomplished without danger of breaking or splitting the branch or limb from which the severed member falls.

My invention also has for its purpose to provide an improved construction of pruning implement in which the operation of selecting and gripping the branches to be pruned or severed is conveniently accomplished and in which the severing mechanism is so arranged, relatively to the clamping or gripping devices that the branches to be cut off can be cleanly cut off and without danger of the severed portion hanging on the part from which it is cut.

With other objects in view that will hereinafter appear, my invention comprehends an improved pruning implement that embodies the peculiar construction and novel combination of parts all of which will be hereinafter fully explained, specifically pointed out in the appended claims, and illustrated in the accompanying drawings in which:—

Figure 1 is a perspective view of my invention applied for use. Fig. 2 is a detail perspective view of the saw. Fig. 3 is a similar view that illustrates the manner in which my pruning implement remains applied to the branch after the outer end is severed therefrom. Fig. 4 is a cross section on the line 4—4 on Fig. 1. Fig. 5 is a perspective view of the gripper members showing the same open and ready to receive a branch. Fig. 6 is a detail perspective view of the upper fixed gripper member. Fig. 7 is a complete side elevation of the upper end of the device and showing the saw as having cut through the limb in dotted lines and about to cut the limb in full lines. Fig. 8 is a plan view of the parts shown in Fig. 7. Fig. 9 is a section taken on the line 9—9 on Fig. 5. Figs. 10 and 11 are detail cross sections on the lines 10—10 and 11—11 of Fig. 5 respectively. Fig. 12 illustrates a tree branch and showing the damaging effect to the branch when pruning under the present ordinary methods.

In its practical arrangement, my invention embodies means mounted upon the upper end of a pole or reach bar in which is included certain elements that are especially designed for closing around and gripping the branch or twig to be cut whereby to hold it firmly and in proper condition for being engaged by a severing device which, in my construction as shown, is in the nature of a reciprocable saw, the said gripping elements including pincers or interlocking clamping members that firmly clasp about the branch during the operation of sawing off the outer end thereof.

Referring now to the details of construction, 1 designates what I term, the fixedly held clamping jaw or member, it being in the nature of an arc shaped body whose outer end is forked to form fingers 25—26 and an intervening space 27.

The body 1 has its inner face suitably shaped for holding a yielding pad or gripper surface 28, its upper edge being formed with a forwardly projected curved guide 23, the purpose of which will presently appear, and at the rear or outer side it has a laterally projected apertured lug 21 to which one end of a spring 22 is secured whose other end is made fast to an apertured ear 20 on the flat shank 4 of the pivoted clamping or gripping member 3 that opposes and coöperates with the member 1, it being concaved to fit around the branch or twig and provided with a tongue or finger 29 that interlocks with the bifurcated end of the opposing clamping member when the two clamping members are closed over the twig or branch, as shown.

The lower or movable gripping member or pincer is provided with a knife edge or blade 3ª located at that edge of the said member 3 over which the severing blade or saw 43, presently again referred to, works.

By reason of having the pincer or gripping member 3 equipped with a knife blade arranged as stated and clearly shown in Figs. 5 and 9, provision is made for effecting a clean cut when serving the limb or branch for the reason that the said blade when closing the pincers on the branch makes an incision on the underside of the branch of sufficient depth to prevent the cut end of the said branch from splitting as the severed portion of the said branch begins to drop down during the final sawing operation, it being understood that the saw blade 43, hereinafter further explained, when making its finishing or final cutting strokes passes down below the said knife edge 3ª and goes completely through the branch and makes a clean finished cut.

The clamping member 1 is integral with or is fixedly connected to a straight shank 2 which has lateral flanges 6 and 7 at the upper and lower edges, said flanges forming, as it were, a socket on the shank for receiving the upper end of the pole or bar 8, that is made fast by the bolt 40 and nuts 42 which pass through the hole end and the apertures in the shank 2, the former also having a non-circular aperture 14 for receiving the squared end 37 of a bolt 36 whose apertured head forms a rope or cable guide 16 and it is held in place by a non-circular bolt 38 that engages a corresponding aperture in the bolt 36.

By referring now more particularly to Fig. 5, it will be noticed that the front edge or rim 24 of the two gripper members 1 and 3 are in a plane parallel with the flat face of the shank 2 and project slightly in advance of the said flat face, the member 23 extending somewhat above the rim 24 on the member 1, the reason for which will presently appear.

The cutting or severing means, in my construction of pruning implement, consists of a long saw blade 43 that travels in the longitudinal plane of the shank 2, and moves over that face of the grippers 1 and 39 having the flat rims 24, referred to, and the said saw is kept from rising up high enough to bend back over the upper pincer or gripper member 1 by the guard or extension 23 before mentioned.

The saw blade 43 includes a flat butt end 44 whose inner edge is cut on two angles (see 50) to provide a solid seat against a like shaped socket or depression 49 formed on the head plate 52, the extension 51 of which extends under the butt end 44 and is made fast thereto by the bolts and nuts 47—48, and bolt 45 and nut 46. Bolt 45 also forms a pivot bolt on which the saw with its head plate is mounted and the said bolt is fixedly connected with a reinforcing member, in the nature of a hollow elongated slide box or frame 64 formed of steel plate and which serves as a socket head for receiving the upper end of a supplemental pole or rod 60, secured within the frame 64 by the bolt 45, that passes through the aperture 65 in one end of the frame, and the cross bolt that passes through another aperture 68ª in such frame.

The head plate 52 is formed with a segmental slot 53 that rides on a guide pin 55 that projects laterally from the frame 64, and the head also has an aperture 54 in which is secured one end of a pull cord or cable 57 that passes through an eye 58 on the frame 64 down within a longitudinal groove 61 on the rod 60 and through guides 83—83 on the said handle, the lower end 85 thereof being attached to a coiled spring 84 that terminates in the hook 86 that joins with an eye 77 projected laterally from the lower end of the rod 60 which terminates in an outwardly angled handle 76.

To hold the rod 60 open for slidable movement on the main pole or bar 8, clip members 72 are secured to the bar 8 by the cross bolts 73 and the nuts 74 and to secure a proper guiding of the rod 60, the clip member has offsets 22ª, as is clearly shown in Fig. 4.

The rope or cable 17 passes through guides 82 on the main frame and at the lower end it carries a wrist loop 80 located adjacent the handle 81 of the main pole, which has a lateral seat upon which is mounted a buffer spring 79 for taking up shocks when the handle 76 with the rod 60 is moved quickly downwardly when operating the implement, as will presently more fully appear.

10 designates a spring plate secured upon the upper flange 7 of the frame formed in the shank 2 of the fixedly held clamping jaw and the said plate terminates in a transverse finger 32 that extends laterally over the face of the shank 2 and rides upon the upper edge of the saw blade 43. The spring 10 has for its object to normally force the head end of the saw down to the position shown in full lines in Fig. 7, to thereby lift the toothed edge high enough to clear the branch or twig to be cut when applying the grippers on the branch or twig to be severed.

From the foregoing description taken in connection with the drawing, the complete construction and the advantages of my invention will be readily apparent. By reason of the coöperative arrangement of the parts, as stated and shown, it follows that the operator can easily manipulate the implement and apply the pruning elements to the desired branch or twig without the need of ladders or climbing upon the tree, and since the gripping members are normally open, the pivoted one being thus swung by the spring 22, and the saw normally held to the elevated position by the flat spring 10, the said pruning members 1 and 2 are positioned on the twig or branch, the pivoted jaw 3 is closed to clamp over the twig or branch by pulling on the cord or cable 17. After the branch is thus gripped, the operator while holding the main pole in one hand, and the cable 17 to its pulled down position by the same hand, pulls the handle 76 downwardly, which moves the frame 64 and the saw carried thereby downward, the finger 32 on the spring 10 serving to force the saw against the branch. At this point, it should be stated, to assist in effecting the desired cutting operation, the saw is provided with a series of perpendicular teeth 67 at the inner or butt end thereof whose purpose is to cut lightly and slowly on the wood, a middle section of teeth 68 shaped to act upon the wood on the pulling action of the saw and another section or series of teeth 69 at the outer end of the saw, which are shaped like the teeth 67, for avoiding excessive work at the top or outer end of the saw blade.

When starting the operation of severing the branch or limb, the rod 60 is first moved slowly and the said movement is continued until the handle 76 contacts with the shock absorber spring 79, it being understood that the saw is now being held down to the work by the spring 10, as is clearly shown in Fig. 1.

When the branch to be severed is of such thickness that the tension of the spring 10 is insufficient to push the saw down all the way through the branch being cut, the action of such spring 10 is supplemented by hooking up the spring 84 to bring it into action, as shown in the drawings.

For cutting small branches or twigs, or when applying the grippers to the branch to be cut, the spring 84 is not in action, and hence the spring 10 when the saw is pushed up until the pivot of the head 52 passes the finger 32, the latter then presses head 52 downwardly, as shown in the drawings, and swings the saw 43 up away from the twig to be gripped, as clearly shown in Fig. 7. After the saw has been pushed up, as before stated, the loop 80 is released or so loosened to allow the pivot member 3 to swing upon any action of the spring 22 (see Fig. 5).

By using yieldable pads on the grippers the said grippers can be readily closed upon the branch to firmly hold the said branch without danger of crushing or injuring the outer surface or bark thereof and furthermore by reason of the said surfaces being yieldable the knife blade can be caused to enter the branch to a degree according to the size of the branch, it being obvious that the tighter the gripper members close upon the branch the deeper will the blade penetrate the limb, it being understood from the drawings that since the saw blade works closely against the knife blade the cut made by the said saw blade merges with the incision made by the blade.

What I claim is—

1. In an implement of the class described, a pole, a gripper and a saw mounted on one end of the pole, means mounted on the pole and controlled from the other end of the pole for operating said gripper to grasp the branch of the tree, and means operated from said other end of said pole for reciprocating said saw, and a spring for pressing the saw against the work.

2. In an implement of the class described, a pole, a gripping device mounted on one end of said pole, means controllable from the other end of said pole for actuating said gripping device, a cutting element reciprocably and pivotally carried by the pole, means operable from said other end of said pole for effecting reciprocation of said element and other means also operable from said other end of said pole for moving said element on its pivot into engagement with the work.

3. In an implement of the character described, a pole consisting of a relatively immovable section and a movable section slidable on the immovable section, gripper members mounted on one end of the immovable section, means controlled from the other end of said immovable section to operate said grippers to grasp the work, a saw pivotally and reciprocably mounted upon one end of the movable section, means on the other end of the movable section whereby said movable section can be reciprocated to thereby reciprocate the saw, and a spring device mounted on the immovable section for coöperatively engaging the saw to turn it on its pivot and thereby hold said saw either out of engagement with the work or in engagement with the work according as the pivot of the saw is to one side or the other of the point of contact of said spring device.

4. In an implement of the character described, a pole consisting of a relatively immovable section and a movable section slidable on the immovable section, gripper members mounted on one end of the immovable section, means controlled from the other end of said immovable section to operate said grippers to grasp the work, a saw pivotally and reciprocably mounted upon one end of the movable section, means on the other end of the movable section whereby said movable section can be reciprocated to thereby reciprocate the saw, and a spring device mounted on the immovable section for coöperatively engaging the saw to turn it on its pivot and thereby hold said saw either out of engagement with the work or in engagement with the work according as the pivot of the saw is to one side or the other of the point of contact of said spring device, and means mounted on the movable section for continuously tending to hold the saw in contact with the work.

5. In an implement of the class described, a pole, a gripping device mounted on one end of the pole, the said device being spring released, and means operable from the other end of the pole for holding the gripping device to its gripping position, a cutting element reciprocably and pivotally mounted on the pole to coöperate with the gripping device, means for effecting reciprocation of the said element, the said means including a rod slidable on the pole, means on the pole for moving the cutting element to its work and other means carried by the slidable rod connectable with the cutting element to assist the first stated means for holding the cutting element to the work.

6. In an implement of the character stated, a pole, a gripping device mounted on the pole, said gripping device consisting of a pivoted jaw, a spring for normally holding the pivoted jaw open, and means operable from the handle end of the pole for moving and holding the pivoted jaw to its gripping position, a saw mounted on the pole, means for forcing the saw down to feed it to the work, and a hand manipulated means on the pole for operating the saw.

7. A pruning implement comprising in combination with a pole and manually controlled means mounted upon the pole for receiving and gripping the branch to be cut; of a cutting device mounted upon the pole, said device including a reciprocable saw blade, manually operated means for operating the saw blade, means on the pole for forcing the blade down against the member to be cut as the said saw is manually operated, and other means for moving the saw out of engagement with the severed member at times.

8. In an implement of the character stated, a pole, means on the outer end of the pole for gripping the branch to be cut, the said means including a fixedly held jaw and a pivoted jaw, the said jaw having interlocking fingers, a spring for normally forcing the pivoted jaw to its open position, a hand controlled means operable from the handle end of the pole for moving and holding the pivoted jaw to its closed position, a saw pivotally and reciprocably mounted on the pole for coöperating with the gripper jaws, other means on the pole that engages the saw and holds it to its work during a certain movement of the said saw and lifts the said saw away from the work under another movement thereof and further means operable from the handle end of the pole for working the said saw.

9. In a pruning implement, a pole, devices on the pole for gripping the branch to be trimmed, means for effecting the operation of the said devices, a saw mounted on the pole, means for holding the said saw and feeding it to the work, the said saw being held to move in close relation at one side of the gripper devices, the said gripper devices including a knife blade for entering the branch to be cut at the branch severing line.

10. In a pruning implement, a pole, devices on the pole for gripping the branch to be cut, means for effecting the operation of the said devices, a saw mounted on the pole, means for holding the said saw and feeding it to the work, and other means for effecting a knife cut in the branch into which the cut in the branch made by the saw finally merges.

11. In a pruning implement of the character stated and in which is included a pole, sawing elements on the pole adapted for being reciprocably moved over the branch to be cut, and means gripping the branch to be cut, the said means being mounted upon the pole and consisting of a pair of opposing jaws at least one of which is movable, the said jaws having yieldable clamping surfaces for gripping the branch, one of the jaws having a knife edge adapted to effect a cut into the branch of a depth in proportion to the yield of the yielding surfaces of the jaws.

DOMENICO RONCONI.

Witnesses:
 FREDERICK S. ANGELUCCI,
 FR. R. MIGLIORINI.

Copies of this patent may be obtained for five cents each, by addressing the "Commissioner of Patents, Washington, D. C."